No. 691,602. Patented Jan. 21, 1902.
W. A. COPELAND, G. JONES & H. A. BALLARD.
MACHINE FOR TREEING BOOTS OR SHOES.
(Application filed May 24, 1898.)
(No Model.) 2 Sheets—Sheet 1.
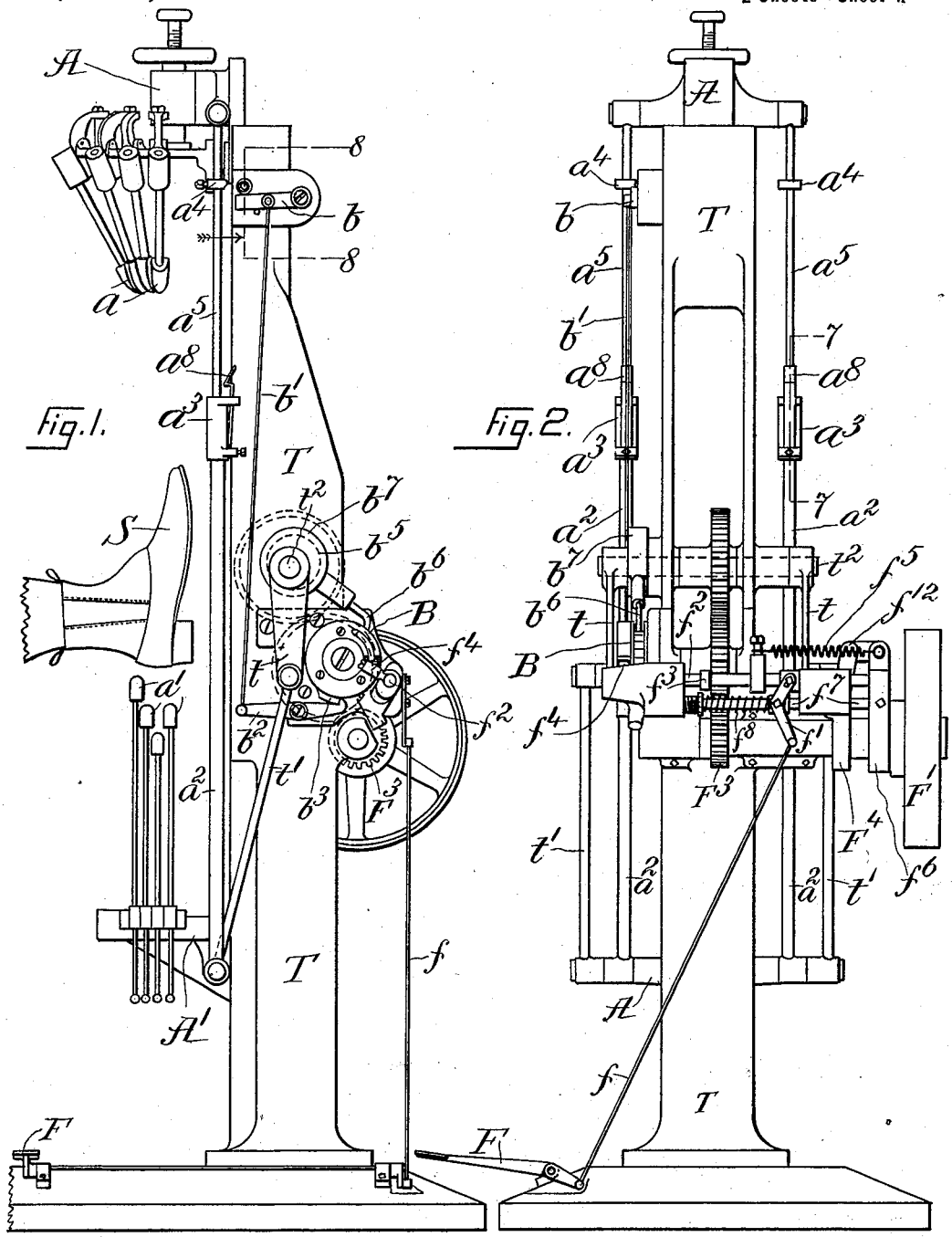

No. 691,602. Patented Jan. 21, 1902.
W. A. COPELAND, G. JONES & H. A. BALLARD.
MACHINE FOR TREEING BOOTS OR SHOES.
(Application filed May 24, 1898.)
(No Model.) 2 Sheets—Sheet 2.
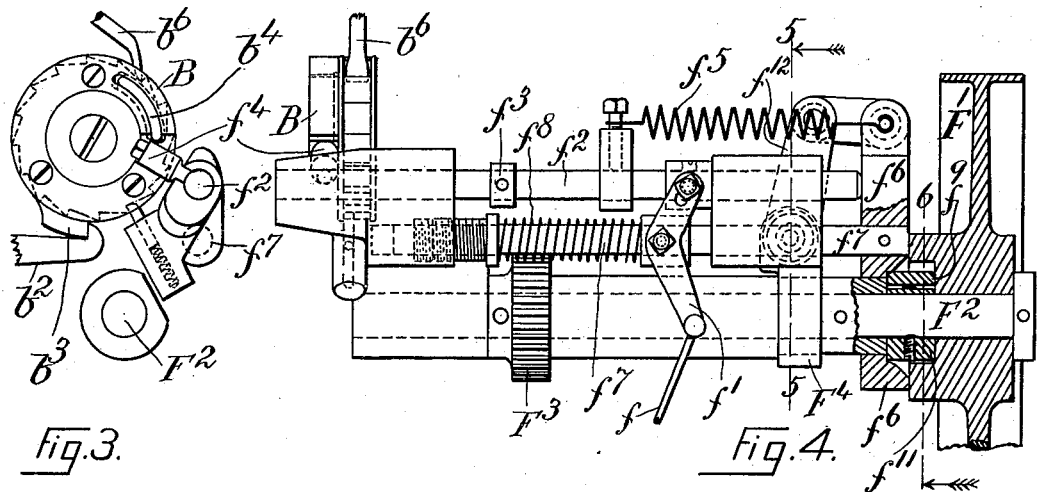
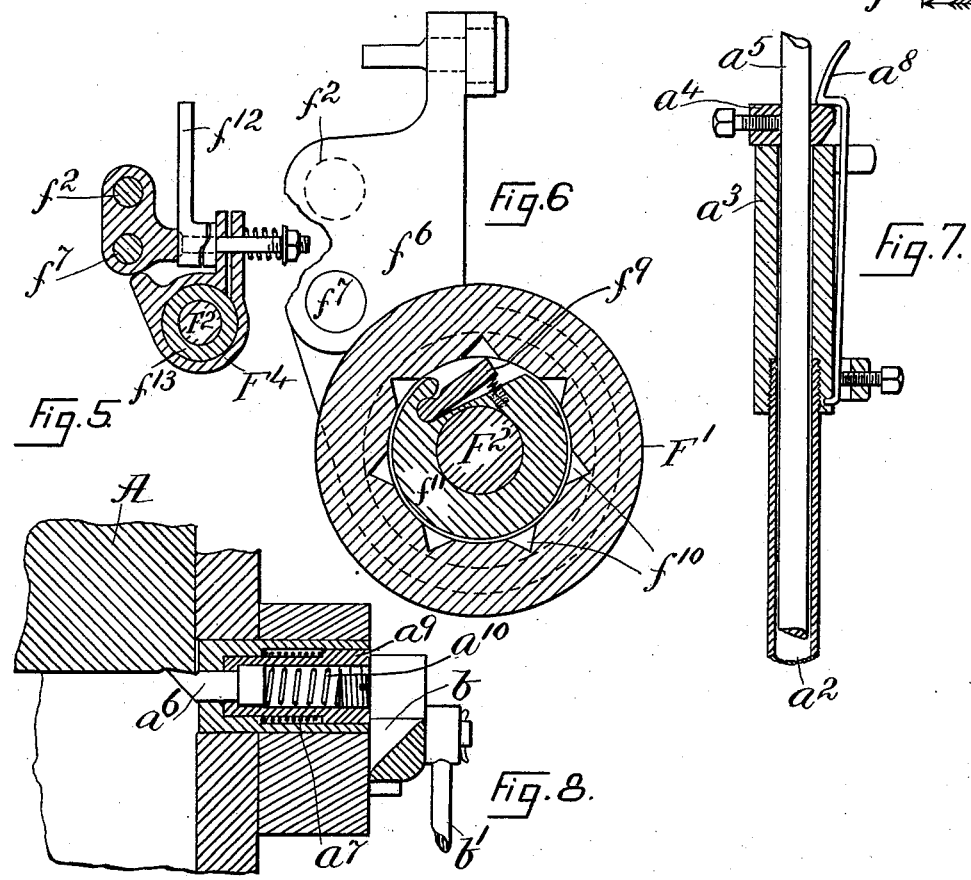
Witnesses:
H. P. Guillo.
Wm Maynadier
Inventors:
William A. Copeland
Goodhue Jones
Harie A. Ballard
by their attorney J. E. Maynadier

UNITED STATES PATENT OFFICE.

WILLIAM A. COPELAND, OF MALDEN, AND GOODHUE JONES AND HARRIE A. BALLARD, OF SOUTH FRAMINGHAM, MASSACHUSETTS, ASSIGNORS TO THE COPELAND BOOT AND SHOE TREEING COMPANY, OF PORTLAND, MAINE, A CORPORATION OF MAINE.

MACHINE FOR TREEING BOOTS OR SHOES.

SPECIFICATION forming part of Letters Patent No. 691,602, dated January 21, 1902.

Application filed May 24, 1898. Serial No. 681,583. (No model.)

*To all whom it may concern:*

Be it known that we, WILLIAM A. COPELAND, of Malden, and GOODHUE JONES and HARRIE A. BALLARD, of South Framingham, in the county of Middlesex and State of Massachusetts, have invented an Improved Machine for Treeing Boots or Shoes, of which the following is a specification, reference being had to the accompanying drawings, in which—

Figure 1 is a side elevation of so much of our improved machine as is necessary to illustrate our invention. Fig. 2 is a rear elevation of Fig. 1. Figs. 3 and 4 are detailed views illustrating the mechanism for automatically stopping the machine after a given number of revolutions. Fig. 5 is a section on line 5 5 of Fig. 4. Fig. 6 is a section on line 6 6 of Fig. 4. Fig. 7 is a section on line 7 7 of Fig. 2. Fig. 8 is a section on line 8 8 of Fig. 1. Figs. 3 to 8, inclusive, are on an enlarged scale for clearness.

In all treeing-machines heretofore known the two carriers which carry the two sets of rubbing or treeing tools are reciprocated by mechanism adapted to give a motion to each carrier different from the motion given to the other, and one distinguishing feature of our machine is that the two tool-carriers travel in unison until they have made the desired number of strokes, when one of them comes to a stop and the other moves away from it and stops.

Another feature of our invention is a positive lock for one of the two tool-carriers and means for operating it to confine and release the carrier, the actuating means being preferably automatically controlled by a time-wheel or its equivalent, although it may of course be controlled by the operator instead of being automatically controlled.

A third feature of our invention is a spring-catch or like yielding means for connecting the two tool-carriers, so that when one of them is locked the connecting means will yield and allow the carriers to separate, this yielding connecting means being sufficient to compel the two tool-carriers to move in unison while the tools carried by them are in operation on the boot or shoe and until one of the two carriers is locked.

A fourth feature of our invention is the combination of a time-wheel or equivalent mechanism with the tool-carriers in such manner that they will move in unison for the desired number of strokes and then be automatically disconnected by means controlled by the time-wheel and stopped each at its proper place.

In the drawings, A A' are tool-carriers which carry the treeing-tools $a$ $a'$. Tool-carrier A' is reciprocated in ways on standard T by suitable mechanism, shown as cranks $t$ and connecting-rods $t'$. When those cranks revolve, the carrier A' is moved toward carrier A until collar $a^3$ on connecting-tube $a^2$ comes in contact with collar $a^4$ on rod $a^5$, which telescopes with connecting-tube $a^2$, and as tube $a^2$ moves with carrier A' and rod $a^5$ with carrier A the result is that carrier A is slightly lifted by the contact of collar $a^3$ with collar $a^4$, and the spring-bolt $a^6$, which is retained in place while carrier A rests on it by the opposite inclines, (clearly shown in Fig. 8,) one of the inclines being on the corner of the carrier and the other on the projecting part of the spring-bolt $a^6$, is no longer retained in place when carrier A is lifted, but is retracted by spring $a^7$, leaving carrier A free to reciprocate with carrier A'. At the same time the spring-catch $a^8$ locks collar $a^4$ to collar $a^3$, thereby connecting the two carriers A and A', which then reciprocate together until the spring-bolt $a^6$ again locks carrier A, when carrier A' moves away from carrier A, the spring-catch $a^8$ yielding and allowing the collar $a^3$ to move away from collar $a^4$, and the cranks $t$ then come to a stop automatically. The spring-bolt $a^6$ is caused to lock carrier A as soon as the two carriers A and A' have made the desired number of strokes by means of mechanism which is shown as a lever $b$, with an incline on it which acts against the end of the sleeve $a^9$, which carries bolt $a^6$, and sleeve $a^9$ and bolt $a^6$ are moved endwise together to cause bolt $a^6$ to lock carrier A when lever $b$ is moved upward by the thrust-rod $b'$, which rod is actuated at the proper time by lever $b^2$ and cam $b^3$ on the time-wheel B, which operates once for, say, sixteen revolutions of the shaft $t^2$ of cranks $t$. Bolt $a^6$ is caused to protrude from its sleeve $a^9$ (see Fig. 8) by a spring $a^{10}$ in order that it and its sleeve $a^9$ may be moved endwise against the force of spring $a^7$ when carrier A is below it or in front of it, so that when carrier A passes bolt $a^6$ during the upward motion of carrier A it will force bolt $a^6$ back against the force of spring $a^{10}$, and bolt $a^6$ will be pushed out below carrier A by spring $a^{10}$ as soon as carrier A permits. The treadle F when depressed by the operator acts through rod $f$ to move lever $f'$ until collar $f^3$ on rod $f^2$ comes in contact with the frame, and this endwise motion of rod $f^2$ carries roll $f^4$, which is on a stud projecting from rod $f^2$, clear of a recess in the time-wheel B and allows slide $b^4$ to fall between roll $f^4$ and wheel B, (shown in Figs. 3 and 4,) and thereby prevents roll $f^4$ from locking wheel B until wheel B has made its revolution and also prevents the return motion of rod $f^2$ under the force of spring $f^5$. Spring $f^5$ is stronger than spring $f^8$, so that when the operator releases treadle F spring $f^5$ is released and overcomes the resistance offered by spring $f^8$ and moves bracket $f^6$ and its supporting-rod $f^7$ in the same direction as that in which rod $f^2$ was moved by lever $f'$—that is, toward and so as to compress spring $f^8$. This movement of bracket $f^6$ against spring $f^8$, which is caused by spring $f^5$, serves to connect driving-pulley F' to shaft $F^2$, and to effect this result the hub of pulley F' is formed with a chamber, within which is a sleeve $f^{11}$, fast on shaft $F^2$, and sleeve $f^{11}$ has mounted on it a spring-pressed pawl $f^9$, as shown clearly in Fig. 6, which when unrestrained engages one of the notches $f^{10}$ in the hub of driving-pulley F' to thereby connect shaft $F^2$ with that pulley; but until lever F is depressed and then released pawl $f^9$ is held out of engagement with notches $f^{10}$ by the conical mouth of the bore of bracket $f^6$, bracket $f^6$ being held at that time against the hub of driving-pulley F' by spring $f^8$. When lever F is released and spring $f^5$ moves bracket $f^6$ away from pulley F' and out of engagement with pawl $f^9$, that pawl is pressed outwardly by its spring into engagement with one of notches $f^{10}$ and the shaft and pulley thereby connected and the machine set in operation. When driving-shaft $F^2$ is thus started, pinion $F^3$ causes crank-shaft $t^2$ to revolve and sets the carriers A and A' in motion, as before explained, and an eccentric $b^5$ actuates pawl $b^6$, fast to the strap $b^7$ of eccentric $b^5$, and the pawl $b^6$ actuates time-wheel B. When time-wheel B has nearly completed one revolution, the cam $b^3$ on time-wheel B actuates lever $b^2$ and brings bolt $a^6$ to place to lock carrier A, as before explained. Moreover, as time-wheel B makes its revolution slide $b^4$ drops back to the end of its slot, the roll $f^4$ being then in contact with the side of the time-wheel B, thus leaving the recess in the side of the time-wheel B open, so that roll $f^4$ will be forced into it by the springs $f^5$ and $f^8$ as soon as the recess gets into place to allow roll $f^4$ to enter it. This motion of roll $f^4$ and rod $f^2$ releases bracket $f^6$ from control of spring $f^5$, and therefore spring $f^8$ forces rod $f^7$ endwise, which moves bracket $f^6$ in a direction to cause the conical mouth of its bore to engage pawl $f^9$ and free it from the notch $f^{10}$ with which it is then engaged. This motion of bracket $f^6$ toward driving-pulley F' is also utilized to apply a brake to shaft $F^2$, and the motion of bracket $f^6$ in the opposite direction—that is, away from driving-pulley F'—is utilized to remove the brake from and free shaft $F^2$, so that when the brake is applied the machine will be stopped with carriers A' and A in the positions shown in Figs. 1 and 2. For this purpose bracket $f^6$ is connected by a link to lever $f^{12}$, the hub of which lever is a cam and acts upon a split ring $F^4$, surrounding sleeve $f^{13}$, fast on shaft $F^2$, one end of split ring $F^4$ being fixed to a stud projecting from the frame of the machine and the other end loose on that stud and arranged next to and acted upon by the cam-surface of the hub of lever $f^{12}$, which is fulcrumed on that stud, as shown clearly in Figs. 4 and 5. When bracket $f^6$ is moved in a direction to disconnect shaft $F^2$ and driving-pulley F', lever $f^{12}$ is moved in one direction and acts to contract split ring $F^4$, so as to engage sleeve $f^{13}$ to prevent shaft $F^2$ from turning. When bracket $f^6$ is moved in the opposite direction to free pawl $f^9$ and connect driving-pulley F' and shaft $F^2$, lever $f^{12}$ is moved in the opposite direction and split ring $F^4$ freed from sleeve $f^{13}$ and shaft $F^2$ thereby released.

It is also desirable to stop the machine at the will of the operator, and this is provided for as follows: When the machine is at rest, pressure on treadle F will simply move rod $f^2$ endwise, as before explained, and releasing treadle F then starts the machine, as before explained; but when the machine is in motion pressure on treadle F will stop the machine and releasing treadle F will again start it. When rod $f^2$ is held in the position it occupies when the machine is running—that is, when rod $f^2$ is held by time-wheel B from moving endwise to the right, as shown in Fig. 4—pressure on treadle F causes lever $f'$ to move on the pin which connects lever $f'$ and rod $f^2$, that pin being then the fulcrum of lever $f'$, and the result is that rod $f^7$ and bracket $f^6$ are moved in a direction to free pawl $f^9$ from its notch $f^{10}$ and to apply brake $F^4$, and rod $f^7$ and bracket $f^6$ are thus moved against the force of spring $f^5$, so that when treadle F is released spring $f^5$ will restore bracket $f^6$ and rod $f^7$ to running position—that is, will release pawl $f^9$ from control of the conical bore of bracket $f^6$ and also release brake $F^4$. In short, the fulcrum of lever $f'$ is between its ends when the machine is started after it has automatically stopped; but the fulcrum is shifted to the end of lever $f'$ when the machine is running, and lever $f'$ is then used to start and stop the machine.

The construction of the tools $a$ and $a'$ and their action on shoe S will be well understood without description by all skilled in this art, and especially by reference to Patents No. 472,108, dated April 5, 1892, and No. 383,279, dated May 22, 1888.

While we have contemplated a positive connection between carriers A and A' and means to automatically engage and release that connection, yet we prefer a connection which will allow carrier A' to move away from carrier A when carrier A is locked, for the reason that the machine is thereby simplified.

Bolt $a^6$ may be restored to place by the operator, as by a treadle controlling rod $b'$, the essential feature being that carrier A shall be stopped when carrier A' is to be moved away from it, and it is preferable to stop carrier A automatically after carriers A and A' have moved as one for a given number of strokes.

What we claim as our invention is—

1. In a treeing-machine the combination of two carriers; means to reciprocate them as one; and means to stop the second and move the first away from the second, and then stop the first, all substantially as described.

2. In a treeing-machine the combination of two carriers; means to reciprocate the first carrier; means to free the second carrier and leave it under control of the first when they are to reciprocate together; and means to lock the second carrier in place when it is to be disconnected from the first carrier; all substantially as described.

3. In a treeing-machine the combination of two carriers; means to reciprocate the first; a yielding catch to connect the first carrier with the second; and means to lock the second carrier in place, when the second carrier is to be stopped; the catch yielding as the first carrier is moved away from the second; all substantially as described.

4. In a treeing-machine the combination of two carriers; means to reciprocate them as one and automatic mechanism which disconnects them after a predetermined number of reciprocations, separates them, and stops them at the predetermined distance apart, all substantially as described.

WILLIAM A. COPELAND.
GOODHUE JONES.
HARRIE A. BALLARD.

Witnesses:
IDA M. HAYNES,
MAY WOODWARD.